D. S. GOSSETT.
PAN LIFTER.
APPLICATION FILED DEC. 4, 1907.
910,190. Patented Jan. 19, 1909.
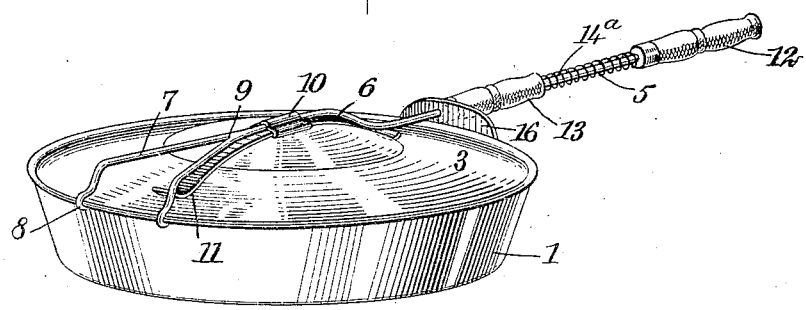
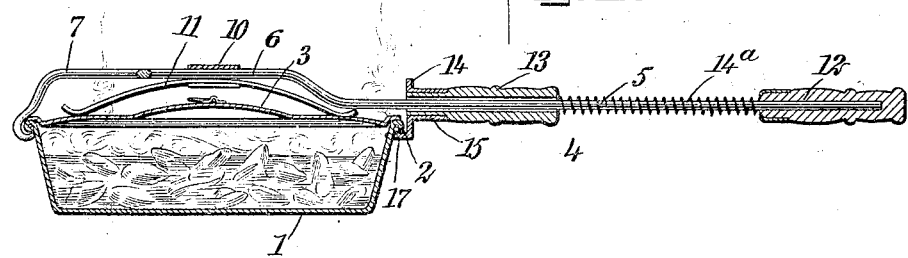
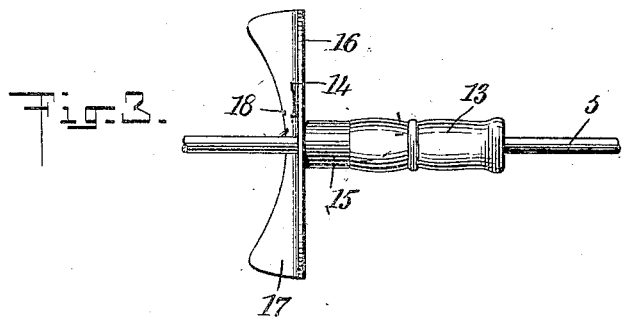
WITNESSES
INVENTOR
David S. Gossett
BY
ATTORNEYS

UNITED STATES PATENT OFFICE.

DAVID SAMUEL GOSSETT, OF PLOVER, IOWA.

PAN-LIFTER.

No. 910,190.  Specification of Letters Patent.  Patented Jan. 19, 1909.

Application filed December 4, 1907. Serial No. 405,012.

*To all whom it may concern:*

Be it known that I, DAVID S. GOSSETT, a citizen of the United States, and a resident of Plover, in the county of Pocahontas and State of Iowa, have invented a new and Improved Pan-Lifter, of which the following is a full, clear, and exact specification.

This invention relates to pan lifters, such as used in removing hot pans or the like from a cooking range.

The object of the invention is to provide a device of this class, which is very simple in construction and which can be quickly applied and removed, and which will operate to hold itself in engagement with the pan after having been applied.

A further object of the invention is to provide a construction for the device, which will enable it to hold the lid of the pan in position at the same time that it holds the device upon the pan.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures, and in which—

Figure 1 is a perspective of a pan, illustrating the device as applied thereto; Fig. 2 is a vertical section through a pan and its cover, and showing the device partly in section; and Fig. 3 is a plan of a portion of the device, further illustrating details of its construction.

Referring more particularly to the parts, 1 represents a pan of any common form, such as shown, being provided at its upper edge, with a bead or lip 2, which projects outwardly. This pan is provided with a removable cover 3 of common form. The pan-lifting device 4, comprises a bar 5 of wire rod or similar material, and at the part of this rod which is applied to the pan, the rod is formed into an upward offset extension 6. This extension is formed at its upper end into a Y having forks 7 which diverge from each other, as shown. The ends of these forks 7 are bent downwardly and formed into claws or fingers 8, which are adapted to engage under the bead 2, as illustrated clearly in Figs. 1 and 2. Near the root or crotch of the Y, I provide a saddle 10 of light sheet metal, which is bent around the offset extension 6, and this saddle rigidly holds in position a leaf spring 11, the edges of the saddle being clamped under the spring, as illustrated most clearly in Fig. 2. This spring 11 is in the form of a bow, as shown in Fig. 2, the ends of the spring being adapted to rest against the upper side of the cover, as shown.

At the end of the bar 5, remote from the pan, a rigid handle or main handle 12 is attached, and slidably mounted on the bar 5, near the pan, I provide a sliding handle or auxiliary handle 13. This handle 13 consists of a tubular sleeve of wood or similar material, at the forward extremity of which a yoke or shoe 14 is attached. This yoke or shoe has a saddle 15, receiving the forward end of the sleeve, and presents a vertically-disposed web or plate 16, which extends transversely to the rod, that is, it extends at right angles to the rod. Upon this plate or web 16 is formed a horizontal flange 17, which projects toward the pan from the lower edge of the plate, and presents a rounded concave edge 18, which is adapted to engage under the bead or lip 2 of the pan, as illustrated in Fig. 2.

For operating the device, the hooks or fingers 8 are applied to the remote edge of the pan, and the bar 5 is held in a position such that the handle 13 when slid toward the pan, may engage the lip 2, as illustrated. In this position of the bar, the spring 11 exerts a resilient downward pressure on the cover and tends to hold the pan in position, as will be readily understood. Attention is called to the fact that the spring 11 has its longitudinal axis disposed in the direction in which the rod extends, so that the point at which the pressure of the spring is exerted is between the points of support of the pan and the lifter. In this way, the spring helps to hold the pan in equilibrium and prevents any tendency of it to tip laterally. It will be noted that this position of the spring facilitates the pouring off of water from the pan without completely removing the cover or the pan lifter. In order to accomplish this, it is only necessary to tip the pan slightly and raise the depressed edge of the cover a little. The spring offers little resistance to the raising of the cover at the side, since the leverage of the spring is short.

In order to hold the shoe 14 against the edge of the pan, I provide a coiled spring 14ª around the stem 5, between the handles 12 and 13, as shown; this spring makes it unnecessary to hold the handle 13 in place with the hand.

Having thus described my invention, I claim as new and desire to secure by Letters Patent:

1. A pan-lifter, consisting of a bar having engaging means for grasping one edge of a pan, a movable engaging member for grasping the edge of the pan at a point opposite said first means, and a resilient member carried by said bar thrusting downwardly and imparting pressure to the pan to maintain said engaging means in engagement therewith.

2. A lifting device, consisting of a bar having means formed at one end thereof for engaging the lip of a pan, a sliding member on said bar, adapted to engage the pan at a point opposite said first means, and a resilient member carried by said bar and thrusting downwardly on the cover of the pan.

3. A pan-lifter, consisting of a bar having forks at the end thereof engaging the lip of a pan, a sliding handle on said bar adapted to engage the pan at a point opposite said forks, and a resilient member between said sliding handle and said forks and thrusting downwardly on the cover of the pan to maintain the pan in engagement with said forks and said handle.

4. A pan-lifter, consisting of a bar having means for engaging the pan at one side, a movable engaging member for grasping the pan at the opposite side, a spring on said bar tending to force said movable engaging member forward, and a resilient member thrusting down on the cover of the pan and holding said bar in engagement with the pan.

5. A pan-lifter, consisting of a bar adapted to be applied across and above the pan and having engaging means for the lip of the pan on opposite sides of the pan, and a bow spring attached to said bar longitudinally therewith and adapted to press the cover of said pan to force the same downwardly, and holding said engaging means against said lip.

In testimony whereof I have signed my name to this specification in the presence of two subscribing witnesses

DAVID SAMUEL GOSSETT

Witnesses:
L. H. BROCK,
J. D. WALLACE.